United States Patent
Keyser

[11] 3,727,876
[45] Apr. 17, 1973

[54] CORE DEVICE FOR VOID FORMING AND GASKET SUPPORT IN A MOLD WALL

[75] Inventor: Lewis R. Keyser, Dayton, Ohio

[73] Assignee: Price Brothers Company, Dayton, Ohio

[22] Filed: Nov. 22, 1971

[21] Appl. No.: 200,972

[52] U.S. Cl. .................249/184, 249/91, 264/274
[51] Int. Cl. .............................................B28b 7/28
[58] Field of Search.................249/94, 96, 97, 150, 249/151, 63, 83, 87, 89, 122, 146, 144, 177, 183, 184; 264/247, 254, 274

[56] References Cited

UNITED STATES PATENTS

| | | |
|---|---|---|
| 1,452,247 | 4/1923 | Mayberry..........................249/151 |
| 1,582,440 | 4/1926 | Uhrig..................................249/184 |
| 3,090,996 | 5/1963 | Reichenbach....................249/83 X |
| 3,148,433 | 9/1964 | Carriker..........................249/177 X |
| 3,356,778 | 12/1967 | Anderson..........................249/89 X |
| 3,363,876 | 1/1968 | Moore...............................249/184 X |

Primary Examiner—J. Spencer Overholser
Assistant Examiner—John S. Brown
Attorney—Lawrence B. Biebel et al.

[57] ABSTRACT

Method and apparatus for forming a void through the wall of a pipe during the casting process and supporting a gasket for embedment in the pipe about the void. The apparatus is made in three pieces, including an outer, contoured mold member which engages the pipe form and supports the gasket by engaging one of the faces, a ring shaped sustaining plate which engages an inner edge of the gasket in an interference fit, and an inner mold member which is also contoured, and in conjunction with the outer mold member, defines the void through the wall of the pipe. The inner and outer mold members, which are relatively expensive, can be stripped from the freshly cast concrete pipe at the same time the pipe form is removed and reused in another casting operation, while the relatively inexpensive sustaining ring is retained in the freshly cast pipe to support the gasket and maintain it round until the concrete has cured to sufficient strength to allow the sustaining ring to be removed.

13 Claims, 5 Drawing Figures

CORE DEVICE FOR VOID FORMING AND GASKET SUPPORT IN A MOLD WALL

BACKGROUND OF THE INVENTION

The above noted, related application discloses a joint which is particularly adapted to provide a seal between a manhole riser and an intersecting feed pipe. In that application a gasket is disclosed which is embedded in the wall of the riser and projects inwardly of the opening through the riser to engage the outer surface of the intersecting feed pipe. The gasket is made of a resilient material which permits the gasket to yield and form a tight seal when the intersecting pipe is thrust into position.

For best results the gasket should be positioned properly with respect to the opening through the riser and have a circular configuration to conform to the outer surface of the intersecting feed pipe. It is important, therefore, that the gasket be supported properly with respect to both the wall of the manhole riser and the opening formed therethrough as concrete or other plastic, curable material is cast in the form for the riser.

The concrete material used in casting the manhole riser or other similar pipes will usually be a fairly stiff mix. Therefore, the forms can be stripped from the freshly cast pipe immediately after casting. This permits a minimum number of forms to be used in the operation and appreciably reduces the capital expenditures which would otherwise be necessary if the forms were retained about the pipe until they had cured.

By the same token it is desirable that the void defining mold members, which are relatively expensive, may also be removed from the freshly cast pipe at the same time the pipe form is removed so that the mold members may also be reused and the number necessary kept to a minimum. However, as noted above, it is important that the gasket be shaped and positioned properly with respect to the wall of the riser and the void formed through the wall thereof.

While the freshly cast concrete, which will usually include a reinforcing cage, is capable of sustaining its own weight, some support must be provided for the resilient gasket to insure that it remains round and positioned correctly in the riser wall until the concrete has cured to a degree sufficient to retain the gasket in place. At the same time, as noted above, it is desirable that the relatively expensive, void defining mold members, which also support the gasket during the casting operation, be removed at the time the form is stripped from the riser for reuse.

SUMMARY OF THE INVENTION

In accordance with the present invention a three piece assembly is provided, including inner and outer mold members, which define a void through the wall of the concrete riser and support a gasket for embedment in the wall in concentric relationship to the void defined therethrough. The assembly also includes a ring shaped sustaining plate which engages an inner edge of the gasket to maintain its circular configuration and position it properly with respect to the void through the riser wall.

While the inner and outer mold members, because of the machining and fabrication procedures necessary to provide these two members with the necessary contour, are relatively expensive, the sustaining plates may be formed from a sheet of steel or the like with a minimum of fabrication and, therefore, are relatively inexpensive.

As a result, several of the sustaining plates can be provided at relatively low cost and retained in position in supporting relationship to the gasket after the relatively expensive form and inner and outer mold members have been stripped from the freshly cast concrete pipe for reuse.

DESCRIPTION OF THE PREFERRED EMBODIMENTS

Figure 1:
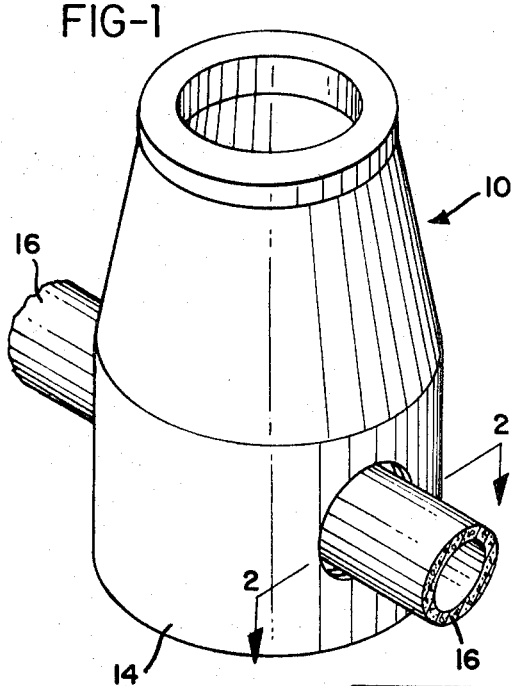
FIG. 1 is a perspective view of a manhole riser and intersecting feed pipe.
Figure 2:
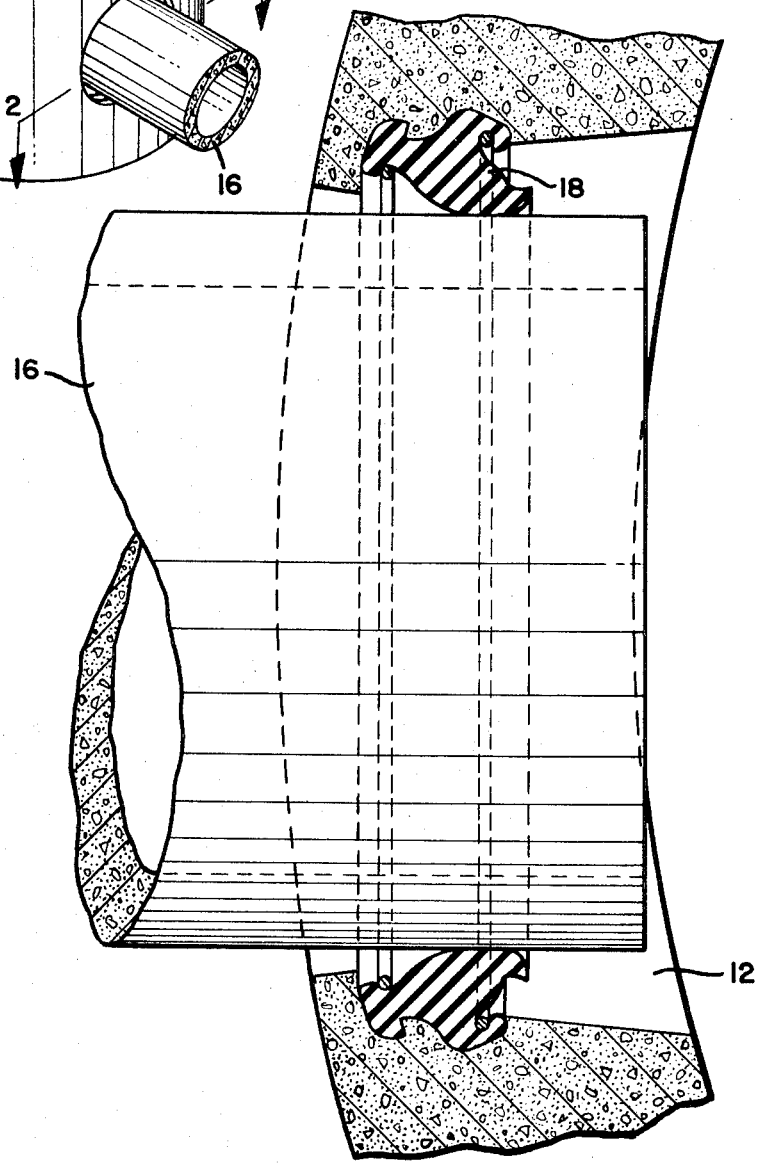
FIG. 2 is a cross sectional view taken on line 2—2 of FIG. 1.

As seen in FIG. 1 of the drawings, an installation in which the present invention may be utilized includes a manhole riser 10 having an opening 12 formed through a wall 14 thereof. An intersecting feed pipe 16 is received in the opening and a gasket 18, having a round configuration to conform to the outer surface of the pipe 16, is, as seen in FIG. 2 of the drawings, embedded in the wall of the riser to engage the outer surface of the intersecting pipe.

Figure 3:
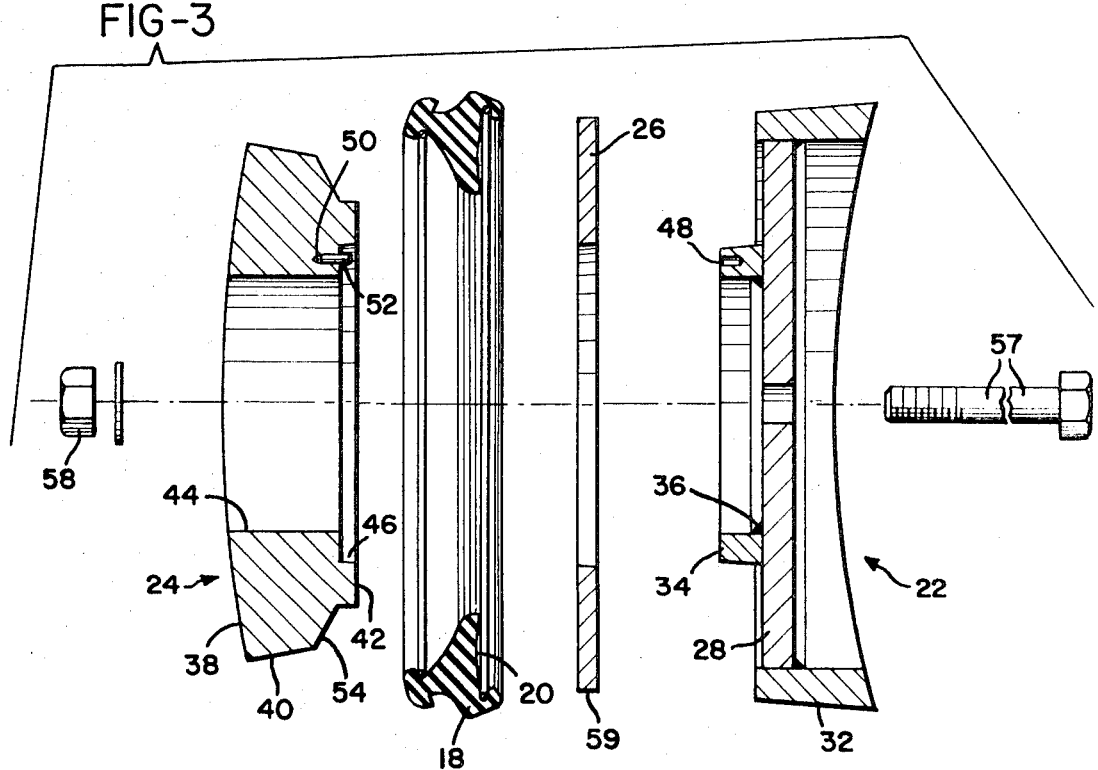
FIG. 3 is an exploded view of the three piece assembly of the present invention.

Apparatus in accordance with the present invention for thus positioning the gasket in the wall of the riser 14 is shown in exploded perspective view in FIG. 3 of the drawings. As seen in FIG. 3, the three piece assembly includes an inner mold member 22, an outer mold member 24 and an intermediate sustaining plate 26. Inner mold member 22 includes a substantially disc shaped base member 28 having an opening 30 formed through the center thereof. An annularly shaped, void defining skirt 32 is attached to the periphery of the base member 28 and extends substantially perpendicularly away from the inner face of the member 28. On the opposite face of the base member 28 an annular flange 34 is secured as by welding 36.

The outer mold member 24 is also of substantially annular shape and includes an outer, contoured form engaging face 38, a peripheral, void defining face 40 and an inner, sustaining plate engaging face 42. At the intersection of a central face 44 and the face 42 the outer mold member is relieved to provide an annular notch 46 complementary to the adjacent faces of the annular flange 34.

It will also be noted that opposed surfaces of the flange 34 and the notch 46 are provided with a series of spaced sockets 48 and 50, respectively, which receive aligning pins 52. At the intersection of the faces 40 and 42 of the outer mold member a second relieved portion 54 is provided to define a second annular notch to receive the gasket 18.

Figure 4:
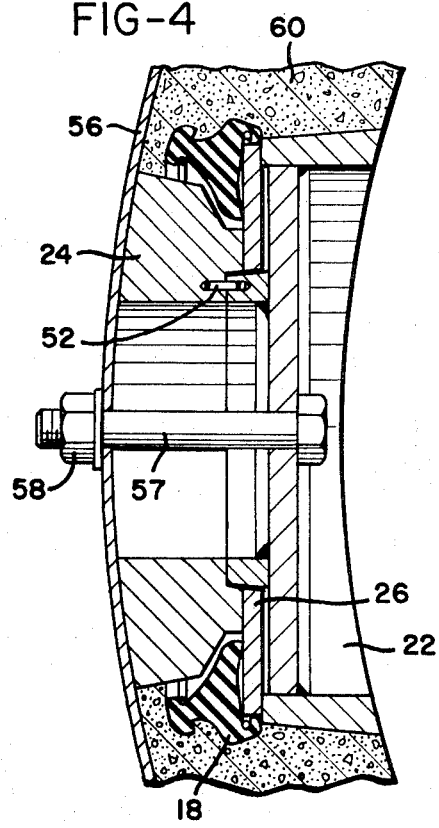
FIG. 4 is a cross sectional view showing the assembly mounted on a pipe form and carrying a sealing gasket.

As best seen in FIG. 4 of the drawings, the three piece assembly may be bolted to a wall of a form 56 by any suitable means. While a bolt and nut 57,58 are shown, it will be apparent that any suitable fastener, such as a key bolt, may also be used. In any case the gasket 18 is engaged and positioned with respect to the form 56 by the outer mold member 24 and sustaining plate 26. The outer edge 59 of the sustaining plate engages on inner edge of the gasket with an interference fit and shapes and supports the gasket in a round configuration. Thereafter, a plastic, curable material, such as concrete 60, is cast in the form with the three piece assembly attached thereto, thereby embedding the gasket in the wall of the riser while forming a void therethrough coincident with the gasket.

Typically the riser or other pipe section may be cast in a vibrated cast process or in a packer head type machine, although it will be apparent that other casting processes may be used. Regardless of the specific casting process used it will be desirable, as is usually done in packer head and vibrated cast processes, to strip the form from the freshly cast pipe so that the form may be immediately reused.

In accordance with the present invention the inner and outer mold members 22 and 24 are also removed from the freshly cast pipe section or riser at the same time the form 56 is stripped therefrom. This is accomplished by removing the bolt and nut 57,58 and the inner mold member 22, stripping the form 56 and thereafter removing the outer mold 24. This permits the relatively expensive mold members 22 and 24 to be reused along with the form 56.

Figure 5:
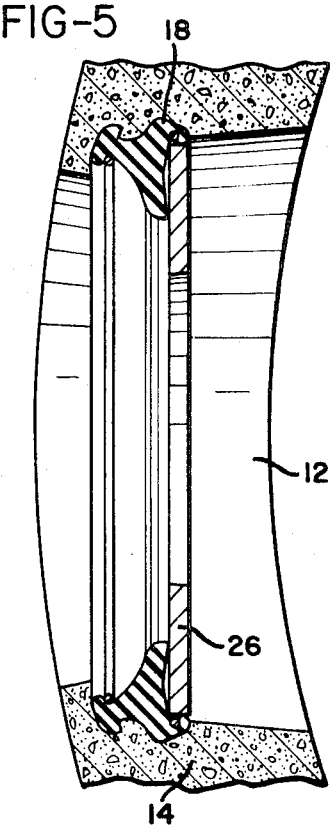
FIG. 5 is a view similar to FIG. 4 but showing the pipe form and inner and outer mold members removed.

However, as seen in FIG. 5 of the drawings, the relatively inexpensive sustaining plate 26 is retained in the freshly cast pipe with its outer edge 59 engaging an inner edge of the gasket in an interference fit. This maintains the gasket in a round configuration and supports it in the pipe until the pipe material has cured. Thus, in accordance with the present invention a number of the relatively inexpensive sustaining plates 26 are provided for an operation, whereas only a relatively few of the more expensive mold members 24 and 26 are necessary.

In the foregoing description the invention is described in conjunction with the formation of pipe sections in a forming process in which only a single, outside form is utilized. In pipe casting processes wherein the form comprises spaced inner and outer elements, the attachment of the three piece assembly described above is modified somewhat. Thus, the usual procedure will be to position reinforcing mesh about the inner form element, cut an opening through the mesh at a point where the gasket is to be installed in the finished pipe, bolt the three piece assembly to the inner form element at that point, and then place the outer form element about these components, after which concrete or the like is deposited in the space between the inner and outer form elements. Additionally, while the inner and outer mold members are described above as being fabricated from a series of components, it will be apparent that they could also be formed as castings. In other respects, however, the process is the same.

From the above it will be apparent that the present invention provides method and apparatus for casting gaskets in a pipe section with an appreciable savings in equipment cost.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. Apparatus for forming a void through a molded wall during fabrication thereof and supporting a gasket for embedment in said wall about said void comprising:
  a. a sustaining plate including an outer, gasket engaging face,
  b. an inner mold member including a peripheral, void defining surface and a portion engaging said sustaining plate,
  c. an outer mold member including an outer, form engaging face, a peripheral, void defining face and a gasket engaging portion, and
  d. means for maintaining said sustaining plate and said inner and outer mold members in assembled relationship with each other with a gasket interposed between said outer mold member and said sustaining plate.

2. The apparatus of claim 1 wherein:
  a. said outer mold member is substantially annular in configuration.

3. The apparatus of claim 2 wherein:
  a. said outer, form engaging face of said outer mold member is curved in cross section to conform to the inner surface of a cylindrical form.

4. The apparatus of claim 3 wherein:
  a. means is provided adjacent an inner face of said outer mold section defining said gasket engaging portion.

5. The apparatus of claim 4 wherein:
  a. said peripheral face of said outer mold member tapers inwardly from said outer face thereof towards said inner face thereof.

6. The apparatus of claim 1 wherein:
  a. said sustaining plate is substantially disc shaped in configuration.

7. The apparatus of claim 6 wherein:
  a. said sustaining plate is substantially ring shaped.

8. The apparatus of claim 1 wherein:
  a. said inner mold member includes a substantially circular base member, and
  b. an annularly shaped, void defining member attached to the periphery of said base member.

9. The apparatus of claim 1 further comprising:
  a. means on said inner mold member for aligning said inner and outer mold members and said aligning plate with respect to each other.

10. The apparatus of claim 1 wherein:
  a. said outer mold member is substantially annular,
  b. said sustaining plate is substantially ring shaped, and
  c. said inner mold member includes an outwardly projecting annular flange received in said sustaining plate and said outer mold member and aligning said inner and outer mold members and said sustaining plate.

11. The apparatus of claim 10 wherein:
  a. said outer mold member is provided with an annular notch adjacent an inner face thereof receiving said annular flange on said inner mold member.

12. The apparatus of claim 11 further comprising:
a. socket means on opposed faces of said inner and outer mold members, and
b. pin means received in said socket means.

13. Apparatus of the type described comprising:
a. an inner mold member including:
   i. a disc shaped base member having an opening through the center thereof,
   ii. an annular, void defining skirt attached to the periphery of said base member and extending substantially perpendicularly with respect to an inner face thereof,
   iii. an annular flange mounted on an outer face of said base member substantially concentrically with respect thereto,
b. a sustaining ring having an outer, gasket engaging face mounted on said inner mold member in encircling relationship to said annular flange thereof and with an inner face overlying said base member outer face,
c. an outer mold member including:
   i. a gasket engaging relieved portion,
   ii. a peripheral, void defining face, and
   iii. an outer, wall form engaging face,
d. registering sockets formed in opposed portions of said outer mold member and said flange,
e. aligning pins received in said sockets, and
f. a bolt member passing through said opening in said base member for clamping said inner and outer mold members and said sustaining ring with a gasket carried thereby in assembled relationship to each other and to a wall form.

* * * * *